United States Patent
Khloponin et al.

(10) Patent No.: US 6,873,641 B2
(45) Date of Patent: Mar. 29, 2005

(54) METHOD FOR PERIODICALLY ELONGATING AN ELECTRODE FOR AN ELECTRIC ARC FURNACE

(75) Inventors: Viktor Nikolaevich Khloponin, Moscow (RU); Ewald Schumacher, Munich (DE)

(73) Assignee: Techom Import-Export GmbH, Munich (DE)

( * ) Notice: Subject to any disclaimer, the term of this patent is extended or adjusted under 35 U.S.C. 154(b) by 0 days.

(21) Appl. No.: 10/472,320

(22) PCT Filed: Mar. 28, 2002

(86) PCT No.: PCT/RU02/00128

§ 371 (c)(1),
(2), (4) Date: Sep. 17, 2003

(87) PCT Pub. No.: WO02/080624

PCT Pub. Date: Oct. 10, 2002

(65) Prior Publication Data

US 2004/0101021 A1 May 27, 2004

(30) Foreign Application Priority Data

Mar. 30, 2001 (RU) .......................................... 2001108391

(51) Int. Cl.[7] .................................................. H05B 7/14
(52) U.S. Cl. ............................................ 373/92; 373/88
(58) Field of Search ................................ 373/88, 91, 92, 373/94, 98, 99, 100

(56) References Cited

U.S. PATENT DOCUMENTS

| | | | | |
|---|---|---|---|---|
| 3,711,889 A | * | 1/1973 | Jennings | 15/227 |
| 3,717,911 A | * | 2/1973 | Gazda | 373/92 |
| 4,435,816 A | * | 3/1984 | Belz et al. | 373/91 |
| 4,691,324 A | * | 9/1987 | Kraus | 373/91 |
| 4,813,805 A | * | 3/1989 | Dagata | 403/32 |

FOREIGN PATENT DOCUMENTS

| | | |
|---|---|---|
| DE | 1272472 | 7/1968 |
| EP | 0260529 | 3/1988 |
| SU | 1702545 | 12/1991 |

* cited by examiner

*Primary Examiner*—Tu Hoang
(74) *Attorney, Agent, or Firm*—Notaro & Michalos PC

(57) ABSTRACT

A electrode and method for periodic elongation of the electrode of an electric arc furnace, includes screwing to the electrode column, a new electrode and a nipple with a longitudinal hole and a metal rod therein. The rod melts at working temperatures of the furnace and fills cavities in the joint between the electrodes and nipple, as well as partially filling an additional cavity in the body of the electrode. A gas mixture from the additional cavity is free of liquid metal being drawn to the working area of the furnace through the holes in the body of the electrode. The electrode is made with additional cavities, placed along the central axis in the bottom of the threaded sockets, the cavities having different diameters and depths and one of them being connected to the external surface of the electrode by holes.

10 Claims, 3 Drawing Sheets

METHOD FOR PERIODICALLY ELONGATING AN ELECTRODE FOR AN ELECTRIC ARC FURNACE

CROSS REFERENCED TO RELATED APPLICATION

This application is a 371 of PCT/RU01/00128 filed Mar. 28, 2002 which claims priority on Russian application RU2001108391 filed Mar. 30, 2001 which priority is repeated here.

FIELD AND BACKGROUND OF THE INVENTION

The disclosed invention relates to manufacturing of steel in electric arc furnaces in ferrous metallurgy.

During the work of the electric arc furnace the energy necessary for metal melting is supplied by the electrode column formed as a set of electrodes joined by threaded nipples. With wear of the electrode, the electrode column is elongated periodically by means of screwing together a new electrode and a nipple, prepared in advance, with the active electrode of the said column.

Being dependent on the method of periodic elongation of the electrode of the electrode column and on the applied nipple and electrode, the specific character of the current flow through the electrode joint (connection) determines, in its turn, the heat released in this part of the electrode column and, consequently, the heating-up of the electrode in the process of its operation. High heating-up temperatures of the electrode in the electric arc furnace considerably enhance its wear and increase the use of costly electrodes per ton of steel made. The method of preliminary preparation of the electrode plays a significant role for the practical realization of the method of periodic elongation of the electric arc furnace electrode.

There is known a method for periodic elongation of the electrode for the electric arc furnace, that includes screwing an earlier prepared biconic threaded nipple onto the active electrode of the electrode column (for example, see "The CESO processing chain for the optimization of the graphite electrode columns". News and Recommendations for AC and DC Arc Furnace Applications by firm SGL CARBON GROUP, January, 1999, p. 3–6).

By means of controlling the process of screwing together the electrodes that are being connected, the known method proposes to solve the problem of reducing the prestressing force of the electrode connection that decreases the working capacity of the electrodes.

The main drawback of the known method consists in leaving the traditional way the current flows through the joint "electrodes-nipple" unchanged. Thus, the known method does not solve the problem of easing the current flow at the joint "electrodes-nipple", which leads to increased heat release in this part of the electrode arc due to additional resistance in the contacts "electrode-nipple-electrode". High heating-up temperatures of electrodes enhance their wear.

There is known a method for periodic elongation of the electric arc furnace electrode, that includes screwing onto the active electrode of the electrode column an earlier prepared new electrode and a threaded nipple, having a longitudinal through hole in which the material with lower melting temperature than the working temperature of the electrode in the furnace is placed (see, for example, patent of the FRG N° 2203226, H05 B7/14 dated Jan. 24, 1972). The material being placed into the through hole of the nipple is resin which during the work of the electric arc furnace cokes and joints the electrodes and the nipple in a single unit.

Considering its main characteristics, the known method for periodic elongation of the electrode is the closest to the one disclosed, due to which the said known method was adopted as a prototype.

The substantial drawback of the known method consists in its low effectiveness in terms of reducing electric resistance in the joint "acting electrode-nipple-new electrode". The mentioned drawback is determined by the fact that the coking material, formed from the resin, and the materials of the electrode and the nipple are, in the end, of the same nature, which means practically the same electric resistance characteristics. Consequently, the realization of the said known method leads to a slight decrease in the energy released in the joint under consideration—"electrodes-nipple"—and thus the electrode warms up considerably in the working area of the electric arc furnace.

The disclosed method for periodic elongation of the electric arc furnace electrode is free of the mentioned drawbacks. It provides for an essential reduction in resistance to the electric current flow in the junction "joined electrodes-nipple". Thus the energy, released in the junction because of the electric current flow, is reduced, due to which the decrease in the heating-up temperature of the elements being joined in the electric arc furnace is attained. Thereby three reasons of the electrode wear are reduced: side surface oxidation, mechanical failures, stub-end losses.

The named technical results are obtained because in the method for periodic elongation of the electric arc furnace electrode, that includes screwing onto the active electrode of the electrode column an earlier prepared new electrode and a threaded nipple having a longitudinal through hole in which the material with lower melting temperature than the working temperature of the electrode in the furnace is placed, according to the invention a metal rod having specific electric resistance a few orders of magnitude lower than the one of the electrode and the nipple materials is inserted into the nipple cavity, while the volume of the said metal rod is chosen so as to provide, after its melting, complete filling up with liquid metal of cavities formed between the nipple and the acting electrode after they have been screwed together, the cavity of the longitudinal through hole in the nipple and the cavity between the nipple and the threaded socket bottom of the new electrode, as well as partial filling of the additional cavity provided for in the threaded bottom of the new electrode, the gas mixture formed in the space of the additional cavity of the new electrode which is free of liquid metal being drawn into the working area of the furnace through special holes in the body of the electrode.

There is known an electric arc furnace electrode, having a threaded socket on both its sides and a specifically shaped cavity in the bottom part of the socket (see, for example, U.S. Pat. No. 4,161,169 dated Nov. 11, 1977 r., H05 B7/14).

The disadvantage of the known electrode is the lack of the technical solution for easing the electric current flow through the joints "electrodes-nipple" after its joining with the active electrode of the electric arc furnace.

There is known an electric arc furnace electrode having threaded sockets on both sides of the electrode that end up with a threadless section (see, for example, the Russian Federation patent N° 2037984, H05 B7/14 dated Jul. 14, 1992 r., published Jun. 19, 1995. Bull. N° 17).

Considering its main characteristics, the said known electrode is the closest to the disclosed electrode due to which it was adopted as a prototype.

The disadvantage of the known electrode is the lack of the technical solution in its design for easing the electric current flow through the joints "electrodes-nipple" after its joining with the active electrode of the electric arc furnace. As a result, functioning of the electrode in the electric arc furnace results in higher resistance to the electric current flow in the joint and release of additional energy that leads to greater heating-up of the junction and the nipple. The latter makes the working conditions of the electrode worse and decreases its performance.

The disclosed electrode is free of the mentioned drawbacks. Its design provides for a technical solution that allows the resistance to the electric current flow in the junction "electrodes-nipple" to be decreased significantly after joining the electrode to the electric arc column. This allows decreasing the general heating-up temperature level of the electrodes and the nipple in their junction and, based on this, reducing the factors of increased electrode wear.

The enumerated technical results are obtained because of the fact that for the realization of the method for periodic elongation of the electric arc furnace electrode, the electrode, having on both its sides threaded sockets ending up with additional threadless sections, according to the invention is equipped with additional threadless cavities—at the bottom of the threaded socket, in the middle, at least on one side of the electrode and at most on its both sides, the depth and the diameter of the said cavity on one of the sides of the electrode having larger values and the cavity being connected to the external surface of the electrode by means of holes. Meanwhile the holes connecting the additional cavity with the external surface of the electrode are inclined, performed at an angle to the other side of the electrode.

There is known a method for preliminary preparation of the electrode for the accomplishment of periodic elongation of the electric arc furnace electrode, including screwing together the electrode and the nipple having a longitudinal through hole into which a substance with the melting temperature lower than the working temperature of the electrode in the furnace is placed (see, for example, the already mentioned patent of the FRG N° 2203226).

Considering its main characteristics, the said known method is the closest to the one disclosed due to which it was adopted as a prototype.

The advantages of the known method include a noticeable simplification of the procedure for periodic elongation of the electrode under the industrial conditions of the electric arc furnace operation. However, the known method has a significant drawback consisting in the fact that the process of preliminary preparation of the electrode in this method includes no methods for considerably decreasing the resistance to the electric current flow in the junction "electrodes-nipple" during the work of the electrode in the electric arc furnace. The said drawback prevents reducing the temperatures up to which the electrode is heating up in this junction, which, in its case, diminishes its performance.

The disclosed method for preliminary preparation of the electrode uses the mentioned advantages of the known method, but is free of its drawbacks. It provides for realizing the techniques that allow, while operating the electrode in the electric arc furnace, an essential decrease in the electrode heating-up temperatures at the junction "electrodes-nipple" and an increase in the performance of the electrode on this base.

The enumerated technical results are attained due to the fact that in the method for preliminary preparation that includes screwing together the electrode and the nipple with a longitudinal through hole into which a substance with the melting temperature lower than the working temperature of the electrode in the furnace is placed, according to the invention into the additional electrode cavity connected by means of holes to the external surface of the electrode, and into the longitudinal through hole of the nipple a two-stage metal rod is installed, the rod stage with greater diameter being placed in the said cavity and compressed to the nipple, while the smaller diameter rod stage being placed in the nipple hole. In addition, the said metal rod is compressed to the nipple by means of a spring made of the same material as the rod. Moreover, the said metal rod is compressed to the nipple by means of metal swarf and (or) granules made of the same material as the rod. Also the said metal rod is compressed to the nipple by means of packing substance that burns out under the working temperature of the electrode in the electric arc furnace.

BRIEF DESCRIPTION OF DRAWINGS

The method for periodic elongation of the electrode for the electric arc furnace, the electrode for realization of the method and the method for preliminary preparation of the electrode are clarified in figures.

DESCRIPTION OF THE PREFERRED EMBODIMENT

Figure 1:
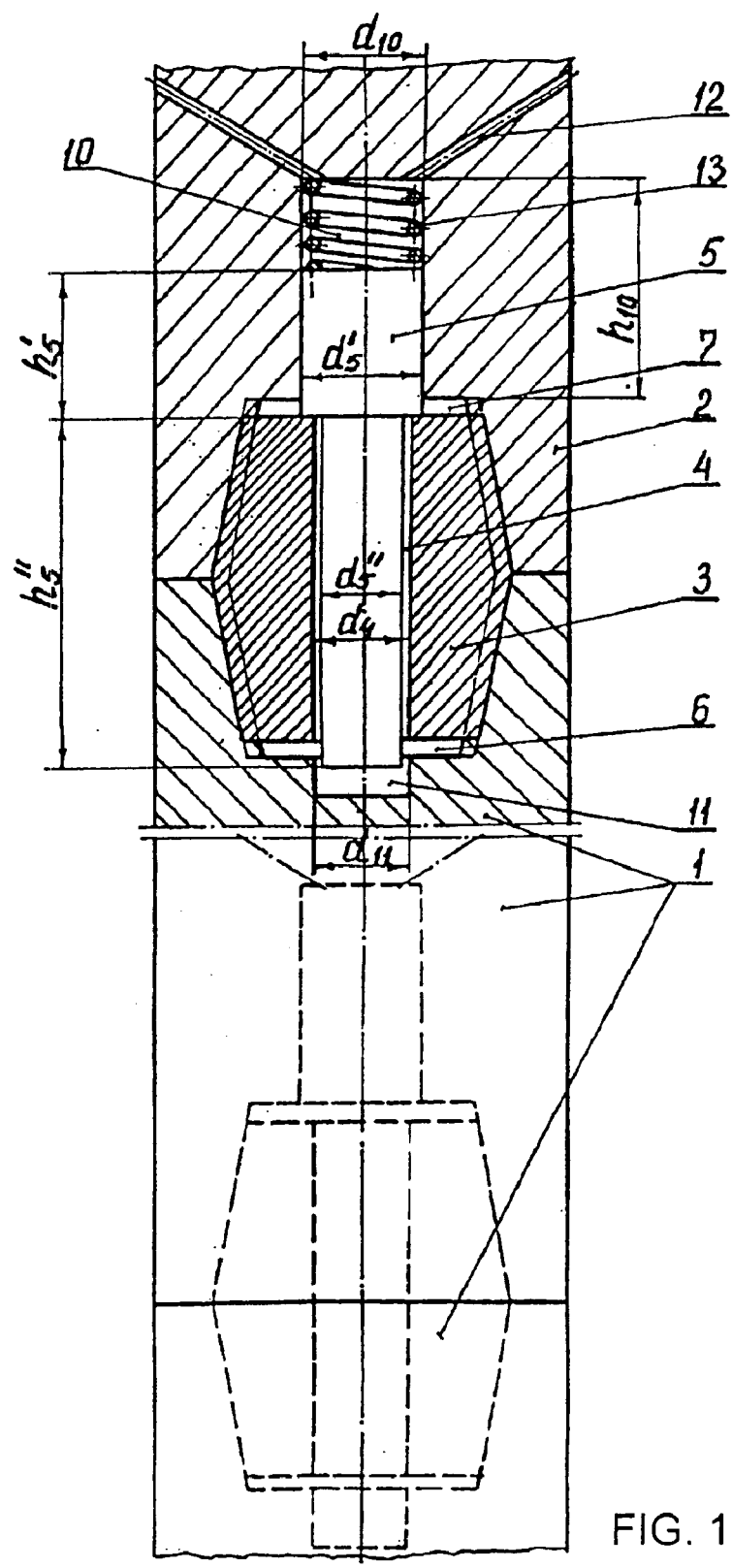
FIG. 1 shows the electrode after the accomplishment of the procedure of periodic elongation of the electrode column.

The electrode column of the electric arc furnace consists of several acting electrodes (FIG. 1) joined by means of a biconic threaded nipple. With the help of new electrode 2 and nipple 3 the electrode column is periodically elongated. Nipple 3 has longitudinal through hole 4 into which metal rod 5, made of the metal with much lower specific electric resistance as compared with the material of the electrode and the nipple (aluminium, copper), is inserted. Between nipple 3 and acting electrode 1 there exists cavity 6 that may remain free or partially filled with substance contributing to better junction of the nipple and the electrode. The same cavity 7 exists between new electrode 2 and the nipple. It may also be free or, as with cavity 6, partially filled with analogous substance.

Electrode 2 (FIGS. 2 and 3) is asymmetric in length: it is equipped with two identical threaded sockets 8 and 9 and additional different threadless cavities 10 and 11. Electrode 2 may include only cavity 10 on one of its sides (FIG. 2), or two cavities 10 and 11 (FIG. 3) on both sides of the said electrode. Furthermore, cavity 10 is of bigger diameter ($d_{10} > d_{11}$ at FIG. 3) and greater depth ($h_{10} > h_{11}$ at FIG. 3) as compared with cavity 11. And the cavity of bigger diameter and depth, i.e. cavity 10, in its upper part is connected to the external surface of the electrode by means of holes 12.

Preliminary prepared electrode 2 and nipple 3 have in longitudinal through hole 4 two-stage metal rod 5 one stage of which is of greater diameter $d'_5$ in comparison with the other $d''_5$, i.e. $d'_5 > d''_5$. In addition, diameter $d''_5$ of 5 is smaller than diameter $d_4$ of nipple hole 3 by the amount of the rod metal linear expansion for the case of increasing temperature from ~20° C. to the melting temperature of the rod. The same reasons are used for the determination of diameter $d'_5$, i.e. $d'_5 < d_{10}$ (in FIGS. 1, 5 and 6 it is not shown to prevent cluttering figures) by the value of the said thermal expansion. Two-stage metal rod 5 with the stage of greater diameter $d'_5$ is installed in cavity 10 of electrode 2. The height of said rod stage $h'_5$ is smaller than the depth of cavity 10 of electrode 2, i.e. $h'_5 < h_{10}$. In addition, the diameter of the metal rod stage $d'_5$ is greater than the diameter of through hole 4 in nipple 3, i.e. $d'_5 > d_4$. In the free space of cavity 10 (due to $h'_5 < h_{10}$) spring 13 (FIGS. 1 and 4) is installed or packing substance 14 is deposited (FIG. 5), that burns out or melts under the working temperature of the electrode in the electric arc furnace. Metal rod 5 after melting under the electrode working temperature turns into liquid metal 15 (FIG. 6) which completely fills up the majority of the cavities in the joint "electrodes-nipple": longitudinal through hole 4 in nipple 3, cavity 6 between nipple 3 and the bottom of the threaded socket of acting electrode 1, additional cavity 11 (in case it exists) in acting electrode 1, and cavity 7 between nipple 3 and the bottom of the threaded socket of new electrode 2 with partial filling of additional cavity 10 up to the level $h_M$ in new electrode 2 (i.e. $h_M < h_{10}$). Along with metal rod 5, spring 13, metal swarf and/or granules 14 (FIG. 5) also turn into liquid metal 15 (FIG. 4), in case they are used. Dimensions of two-stage metal rod 5, spring 13, swarf and/or granules 14 provide for the mentioned filling up of cavities formed after screwing together electrodes 1 and 2 and nipple 3.

Figure 6:
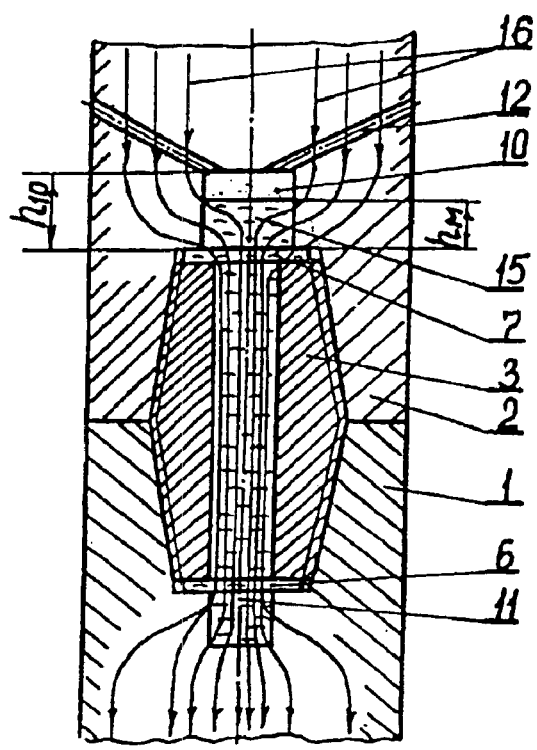
FIG. 6 shows the main features of the electric current flow through the joint "electrodes-nipple" in the disclosed method for elongating the electrode.
Figure 7:
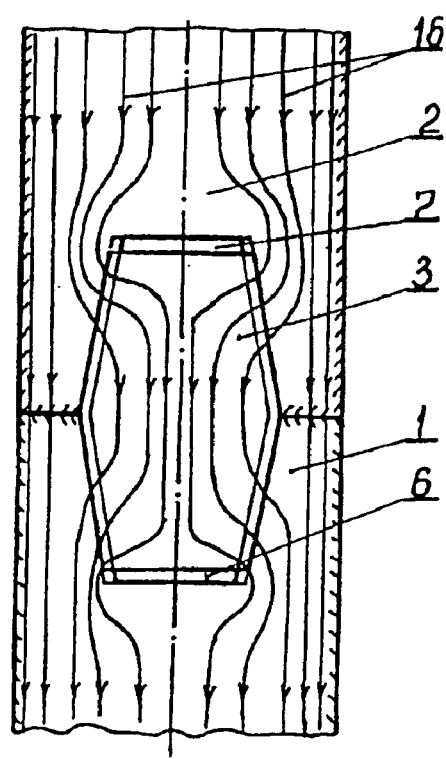
FIG. 7 shows the main features of the electric current flow through the joint "electrodes-nipple" in the known method for elongating the electrode.

The main flows of electric current 16 for the case of realizing the present invention pass through the joint "connected electrodes 1 and 2-nipple 3", as shown in FIG. 6, and for the known method-as shown in FIG. 7.

The method for periodic elongation of the electrode for the electric arc furnace is accomplished in the following way.

Figure 2:
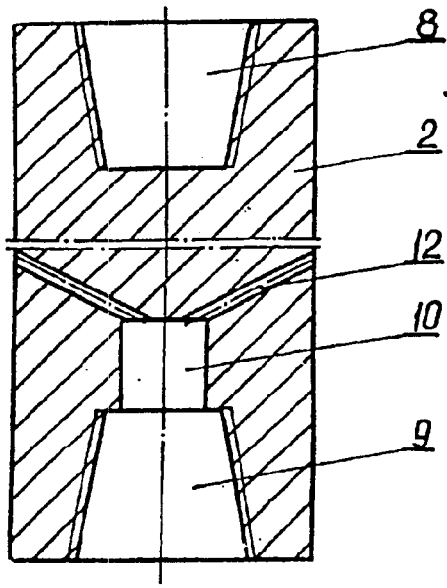
FIGS. 2 and 3 show versions of the electrode for the procedure of periodic elongation of the electrode column.
Figure 3:
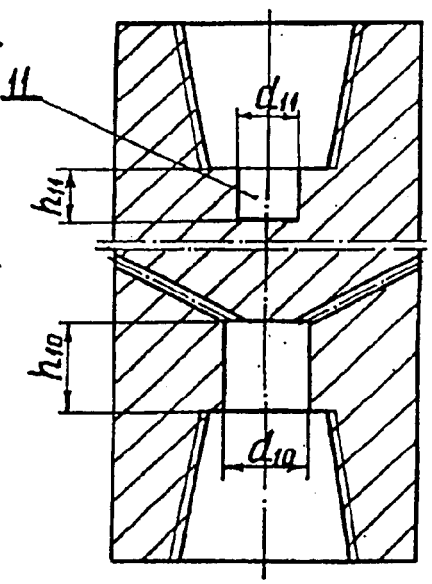

In electrode 2 (FIGS. 2 and 3) of the known design (made of graphite or carbon), having on both sides identical threaded sockets 8 and 9, additional threadless cavities 10 and 11d are executed along the electrode axle (FIG. 3). Meanwhile, if the next screwing together of acting electrode 1 with nipple 3 (FIG. 1) takes place without filling cavity 6 with substance for better junction of nipple 3 and electrode 1, it is possible not to make additional cavity 11 in the electrode (FIG. 2).

Cavities 10 and 11 are executed in the center of the bottom of threaded sockets 8 and 9 so, that they have different diameters $d_{10}$ and $d_{11}$ as well as different depths $h_{10}$ and $h_{11}$. Set $d_{10} > d_{11}$ and $h_{10} > h_{11}$.

Cavity 10, in its part nearer to the bottom or with an outlet to the bottom, by means of holes 12 (the number of which is usually not less than 2) is connected to the external surface. Holes 12 are performed inclined, at an angle to the other side of the electrode (FIGS. 2 and 3).

Preliminary preparation of electrode 2 (FIGS. 2 and 3) is accomplished in the following way.

Electrode 2 is screwed together with nipple 3 (FIGS. 4 and 5) having longitudinal through hole 4 with diameter $d_4$. Screwing together is carried out by the side of electrode 2 executed with additional cavity 10, i.e. nipple 3 is screwed into threaded socket 9.

Before screwing together electrode 2 and nipple 3, spring 13 and two-stage rod 5 are installed in cavity 10, rod 5 stage of greater diameter $d'_5$ being placed into cavity 10. Spring 13 is made of the same metal as the rod.

Figure 5:
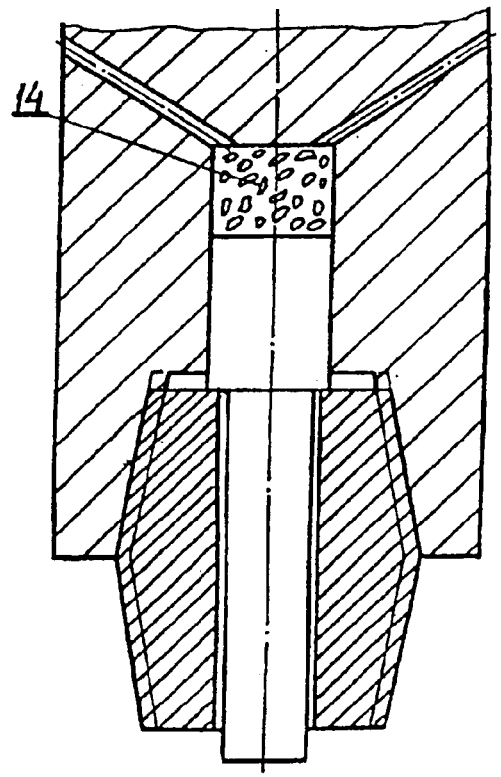

Packing material 14 may be used in place of spring 13 in cavity 10 (FIG. 5). This material may be swarf, granules or a mixture of swarf and granules of the same material as rod 5.

The packing material may be fabric, paper or other substance the combustion temperature of which is lower than the electrode working temperature during its work in the electric arc furnace (400 ... 500° C. beyond the furnace area, and up to 2100 ... 2500° C. in the working area of the furnace).

Screwing together electrode 2 and nipple 3 provides for the existence of cavity 7. In the said cavity one may place substances (various kinds of resin) for better junction of the electrode and the nipple. The current invention does not consider this known operation, as its implementation does not change the essence of the invention.

After the described actions, screwing together electrode 2 and nipple 3 is carried out. During this operation, due to the adopted ratio of dimensions of rod 5 stages,:

$d'_5 < d_{10}$ by the difference between thermal expansions for these dimensions with the change in temperature from ~20° C. to the melting temperature of rod 5 metal;

$h'_5 < h_{10}$ with allowance for compression of spring 13 (packing of material 14);

$d''_5 < d_4$ by the difference between thermal expansions for these dimensions with the change in temperature from ~20° C. to rod melting temperature; and $d''_5 < d'_5$, after screwing together the electrode and the nipple, rod 5 is compressed to the end face of nipple 3, placing the stage of rod 5 with smaller diameter $d''_5$ in hole 4 of nipple 3.

The described operations of screwing together electrode 2 and nipple 3 with longitudinal through hole 4 and installing into them two-stage metal rod 5, comprise the essence of the invention for preliminary preparation of the new electrode and nipple to the realization of the method for periodic elongation of the electrode for the electric arc furnace.

Figure 4:
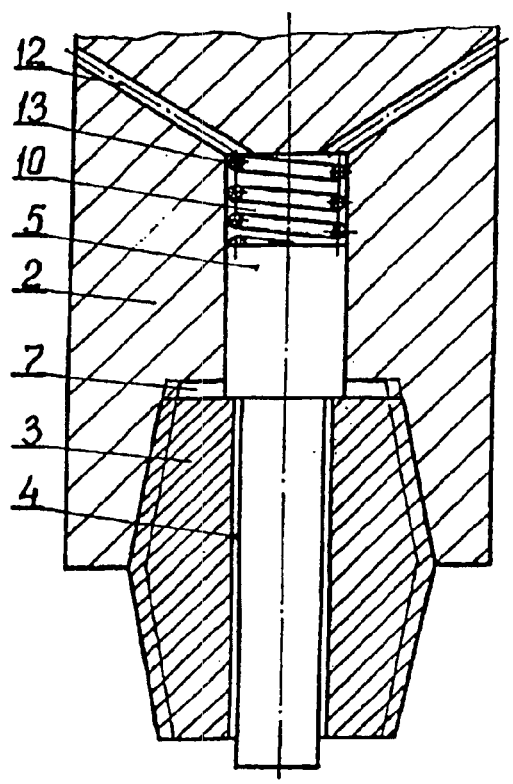
FIGS. 4 and 5 show realization versions for the method of preliminary preparation of the electrode for the accomplishment of the method for periodic elongation of the electrode column.

The named operations of preliminary preparation of the electrode and the nipple are carried out at the electrode manufacturing plant and the consumer receives the new electrode in the form presented in FIGS. 4 and 5.

The process of periodic elongation of the electrode for the electric arc furnace is accomplished with the help of the new electrode preliminary prepared in accordance with the technique described above.

The cavity of threaded socket 8 with additional cavity 11 is cleaned on acting electrode 1 of the electrode column by means of compressed air.

Earlier prepared new electrode 2 with nipple 3 and metal rod 5 is screwed up to the tight contact of the face surfaces of new electrode 2 and acting electrode 1.

So, the realization of this method preserves the main operations of the elongation procedure for the electric arc furnace electrode. However, the use of the proposed method for electrode elongation, the electrode itself and the method of its preliminary preparation fundamentally changes the way the electric current flows through the joint "electrodes 1 and 2-nipple 3" in comparison with the known method.

The change is that under the disclosed method main flows of electric current 16 (FIG. 6) by-pass the joint, while under the known method (FIG. 7) these flows have to pass through the junction "connected electrodes 1 and 2-nipple 3" with significant electric resistance. The said picture of the known method is additionally worsened by the fact that with the increase in the temperature of the joint area, caused by its entrance into the working area of the furnace, the contact in the junctions "electrode 2-electrode 1-nipple 3" deteriorates. The latter effect of the known method leads to an uncontrolled increase in the resistance to the electric current flow in the mentioned joints and to a significant heating-up of this section of the contacts (according to the known data by SGL CARBON GROUP up to 2000 . . . 2500° C.).

Positive changes in the process of the electric current flow through the junction "joined electrodes-nipple" according to the current method are obtained by means of the following techniques.

1. For manufacturing rod 5 metals are used with specific electric resistance $\rho_{E_M}$ of a few orders of magnitude lower, than the one of the electrode and the nipple. It may be aluminium. For aluminium $\rho_{E_M} \cong 2,7 \cdot 10^{-2}$ $\mu$Ohm·m, while for graphite—the material for manufacturing electrodes—$\rho_{E_2} = 5 \ldots 13$ $\mu$Ohm·m.

It may be copper, for which $\rho_{E_M} = 1,7 \cdot 10^{-2}$ $\mu$Ohm·m.

Meanwhile, the choice of metal for the rod depends on the quality of steel produced in the furnace.

2. Metals with melting temperatures below the working temperature of the electrode in the furnace are used for making rod 5. Thus, aluminium melting temperature makes up 660° C., copper—1083° C., i.e. using these metals meets the requirement.

3. When choosing metal rod 5 dimensions it is presumed that its volume in solid state will provide after melting filling up with liquid metal all cavities formed between the nipple and the acting electrode on completion of their screwing up (cavities 6 and 11), longitudinal through hole 4 in the nipple, as well as cavity 7 between the nipple and the threaded socket bottom of the new electrode. Meanwhile additional cavity 10 within the new nipple is to be filled only partially, i.e. height $h_M$ in FIG. 6 must be smaller than cavity 10 depth, i.e. $h_M < h_{10}$. So:

$$V'_5 + V''_5 > V_{11} + V_6 + V_7, \quad (1)$$

$$\text{but } V'_5 + V''_5 < V_{11} + V_6 + V_7 + V_{10}, \quad (2)$$

where $V_i$—volumes of appropriate cavities (6, 7, 10 и 11) and stages of rod 5.

The said formulas determine for chosen diameters of rod stages d'$_5$ and d"$_5$ their linear dimensions h'$_5$ and h"$_5$. In this respect it should be taken into account that in the process of melting the volume of liquid metal is increased, for example, for aluminium it increases by 1,048 times, for copper—by 1,042 times. Furthermore, an addition of the liquid metal volume due to the melting of spring 13 or metal swarf/granules 14 is also taken into consideration.

Observing the ratio $h_M < h_{10}$ provides a constant link of cavity 10 through holes 12 with the external surface of the electrode. Through this way the gaseous mixture formed while melting the metal of the rod is drawn from the cavity to the working area of the furnace. In case packing substance (fabric, paper, etc.) 14 is used, its combustion products are drawn through holes 12. Generated vapours of liquid metal 15 are also drawn through holes 12 in case of its accidental boiling (for example, the boiling temperature of aluminium is 2317° C., of copper—2540° C., and it may fall within the range of the temperatures up to which the electrode can heat up during its work).

From known correspondences for determining electric resistance, energy released from the body in the process of electric current flow and body temperature changes caused by released energy the following equation may be drawn:

$$T_M = \frac{\gamma_2 \cdot c_2 \cdot T_2 \cdot \rho_M}{\gamma_M \cdot c_M \cdot \rho_2} \cdot \frac{D_2^4}{d_4^4}, \quad (3)$$

where $T_M$—the preferable temperature up to which liquid metal 15 is heated up while the electric current flows through it;

$T_2$—the temperature up to which the electrode and the nipple are heated up in the known method while the electric current of the same parameters as for temperatures $T_M$ flows through them;

$\gamma_2$—the density of materials used for the electrode and the nipple (presume approximately equal);

$c_2$—the specific heat of materials used for the electrode and the nipple (presume approximately equal);

$\rho_2$—the specific electric resistance of materials used for the electrode and the nipple (presume approximately equal);

$D_2$—the outer diameter of the electrode;

$d_4$—the inner diameter of longitudinal through hole 4 in the nipple;

$\gamma_M$, $c_M$ and $\rho_M$—the same values, but for liquid metal 15.

Correspondence (3) is used while choosing diameter $d_4$ of the hole in nipple 3 for the known properties of the material of electrode 2 and nipple 3, as well as of the metal used for rod 5. One proceeds from $T_2$ values of electrode 2 and nipple 3 heating-up in the known method and the preferable temperatures of liquid metal heating-up $T_M$ in the disclosed method as a result of the equal strength current passage.

Based on the obtained value of $d_4$ and the mentioned effects related to the linear thermal expansion of the rod and the nipple, the rod stage diameter d"$_5$ is set. The diameter of cavity 11 is set 10 . . . 20 mm greater than diameter $d_4$, in order to eliminate abutting of rod 5 against acting electrode 1 during the electrode column elongation procedure. The diameter of cavity 10 is set 30 . . . 40 mm greater than diameter $d_4$, in order to provide sure, compression of rod stage with diameter d'$_5$ to the nipple face. Diameter d'$_5$ is set on the basis of the above mentioned effects related to the linear thermal expansion of the rod and the nipple.

The known values of diameters $d_4$, d'$_5$, d"$_5$, $d_{10}$ and $d_{11}$ and the suggested volumes of cavities 6 and 7, the linear dimensions of the nipple and the adopted depth of cavity 11 (may be absent, as it was stated, in a number of considered cases) let formulas (1) and (2) determine the suggested value of height $h_M$ of the liquid metal formed after melting of metal rod 5. In case of using spring 13 as well as swarf/granules 14, the obtained value $h_M$ is verified. The latter permits setting the depth of cavity 10 ($h_{10}$).

While setting value $h_{10}$ and justifying dimensions h'$_5$ and h"$_5$ it is important to ensure after the rod melting the inequality $h_M < h_{10}$, i.e. to leave a part of cavity 10 free of liquid metal.

While performing the above-mentioned simple operations on setting the named parameters one goes by the following known data on the physical properties of the joined materials of the electrode, nipple and metal rod:

1. The specific electric resistance of graphite is 5 . . . 13 mOhm×m and with increasing temperature up to 2500° C. it grows approximately three-fold;

2. The specific electric resistance of aluminium is 2.7× $10^{-2}$ mOhm×m; with increasing temperature and transition to liquid state at t=660° C. rises up to ~35×$10^{-2}$ mOhm×m at temperature exceeding 1200° C.;

3. The specific electric resistance of copper is $1.7 \times 10^{-2}$ mOhm×m; with increasing temperature and transition to liquid state at t=1083° C. rises up to ~$25 \times 10^{-2}$ mOhm×m at temperatures about 1500° C.;
4. The volume of aluminium after transition from solid to liquid state increases by 1,048 times, the volume of copper—by 1,042 times;
5. Graphite density is usually 1.9 . . . 2.3 t/m³ (in electrodes sometimes it is provided at the level of 1.7 t/m³);
6. Aluminium density is usually set equal to 2.39 t/m³; copper density—to 8.9 t/m³;
7. Graphite specific heat is $$0.5 \frac{kcal}{kg \cdot K};$$

8. Aluminium specific heat is $$0.238 \frac{kcal}{kg \cdot K}; \text{ copper} - 0.097 \frac{kcal}{kg \cdot K};$$

9. Coefficient of the linear expansion of the electrode and nipple graphite is set as identical and equal to $1.8 \times 10^{-6}$ K$^{-1}$;
10. The coefficient of linear expansion for aluminium is $46 \times 10^{-6}$ K$^{-1}$; for copper—43.3 K$^{-1}$.

EXAMPLE 1

In 120 t DC arc furnace steel 15×6CIO is made with the use of graphite electrodes 1 with diameter D=700 mm. During the work of the electric arc furnace the electric current of 110 kA passes through the electrode. Electrodes 1 are united into an electrode column, obtained by joining electrodes 1 by means of biconic threaded nipples 3.

Under these conditions and with the use of the electrode column obtained by elongation of the electrodes of the known design by means of the known elongation method, the passage of the above mentioned current through the column would result in the heating of joints "electrode-nipple" within the furnace up to the temperature of $T_2$ @ 2300° C. The mentioned high value of temperature is, firstly, due to the necessity of using high amperage, secondly, due to high specific electric resistance of the electrode and the nipple materials and, thirdly, due to the design of the joint "electrode-nipple" and, consequently, due to the method of their elongation.

The known design of the electrode and the electrode column elongation method includes the joint "new electrode-nipple-acting electrode" through which the electric current passes according to the scheme shown in FIG. 7 having significant resistance on its way in places where the connected elements are in contact. Furthermore, because of the intensive heating-up of the electrodes and the nipple, the junction density provided at the stage of preliminary preparation of the electrode and during the elongation procedure deteriorates. It results in a multi-fold increase in the electric resistance of the stated contacts of the electrodes and the nipple being joint, which is hard to forecast and uncontrolled. Let's assume that the resistance in the known elongation method at the temperature of 2300° C. increases three-fold. The release of heat at the mentioned contacts leads to enhanced heating-up within the electrode and growth of tangential stress in the surface layers of the electrode. The latter increases the probability of destroying electrode and enhances the use of electrodes per ton of the steel produced.

Aluminium metal rod 5 is used. With the help of equation (3), for, say $T_M$=1700° C. and given above physical properties of graphite and aluminium, the diameter of the longitudinal through hole in the nipple is set equal to:

$$d_4 = \sqrt[4]{\frac{1.7 \cdot 0.5 \cdot 35 \cdot 10^{-2} \cdot 2300 \cdot 700^4}{2.7 \cdot 0.238 \cdot 15 \cdot 3 \cdot 1700}} = 240 \text{ mm.}$$

Let $d''_5$=233 mm, $d_{11}$=250 mm, $d_{10}$=270 mm, $d'_5$=262 mm. The volume of cavities 6 and 7 is set about the same and equal to 2500 cm³ for each cavity.

Using the said parameters and inequalities (1) and (2) linear dimensions $h'_5$, $h''_5$, $h_{11}$ (in case cavity 11 is present) and $h_{10}$ are set, ensuring inequality $h_M < h_{10}$.

According to the obtained parameters a new electrode (FIGS. 2 and 3), a nipple and a metal rod of aluminium are produced, get preliminary preparation (FIGS. 4 and 5) and delivered in this state for elongation of the electrode for the electric arc furnace.

In the obtained joint "new electrode-acting electrode-nipple" under working conditions in the furnace area the current flow is provided so, that it by-passes the joint as much as possible (see FIG. 6). It permits eliminating one of the sources of considerable wear and destruction of the electrode column, as well as increased use of electrodes per ton of steel made.

Ingress of aluminium in steel during the deterioration (wear) of the electrode does not spoil melting, as aluminium is included into the chemical composition of steel.

EXAMPLE 2

For parameters of the electric arc furnace in accordance with example 1, steel 06X23H28M3,д3T (Эи943) consisting of 2.5 . . . 3.5% of copper is melted in Graphite electrodes 1 with diameter D=750 mm are used, through which the electric current of 110 kA is passed. Electrodes 1 are united into an electrode column obtained by joining electrodes 1 by means of biconic threaded nipples 3. Under these conditions, the use of the known electrode and the known elongation method the passage of the current through the electrode column would result in heating the joints "electrode-nipple" of the column in the furnace area up to the temperature of $T_2$=2100° C.

The disclosed electrode (FIG. 2 or 3) is used. The properties of the electrode and the nipple are the same as in example 1. Copper rod 5 is inserted into the electrode during the process of preliminary assembling (preparation).

Using equation (3) at, for example, $T_M$=1700° C., and with the said data on physical properties of graphite and copper, the diameter of the longitudinal through hole in the nipple is set equal to:

$$d_4 = \sqrt[4]{\frac{1.7 \cdot 0.5 \cdot 25 \cdot 10^{-2} \cdot 2100 \cdot 750^4}{8.9 \cdot 0.097 \cdot 15 \cdot 3 \cdot 1700}} = 215 \text{ mm.}$$

The nipple parameters are unified, and in the same way as in example 1 value $d_4$ is set equal to 240 mm.

Set: $d''_5$=229 mm, $d_{11}$=245 mm, $d_{10}$=270 mm, $d''_5$=258 mm; the volumes of cavities 6 and 7 are considered almost identical and equal to 2500 cm³ for each cavity.

Using the said parameters and inequalities (1) and (2), linear dimensions $h'_5$, $h''_5$, $h_{11}$ (in case cavity 11 is present) and $h_{10}$ are set, ensuring inequality $h_M < h_{10}$.

The final effect is the same as in example 1. Meanwhile, due to the increase in diameter of the hole in nipple up to the value of $d_4=240$ mm, temperatures of $T_M<1700°$ C. are obtained. Ingress of copper in steel during the deterioration (wear) of the electrode doesn't spoil melting, as copper is included into the chemical composition of steel.

As a whole, the realization of the disclosed method for periodic elongation of the electrode for the electric arc furnace, the realization of the electrode for the implementation of the method, and the realization of the method for preliminary preparation of the electrode decrease significantly the resistance of the joint "electrode-nipple" to the electric current flow, improve the temperature distribution over the cross section of the electrode in this the most important part of the electrode column. The set of the mentioned technical achievements eliminates the main reasons for the low durability of electrodes caused by cracks, ruptures and failures.

Thus, the realization of the disclosed method for periodic elongation of the electrode for the electric arc furnace, the realization of the electrode for the implementation of the method, and the realization of the method for preliminary preparation of the electrode permit reducing the use of electrodes per ton of steel made, and, in case of necessity, increasing the amperage in heavy-weight electric furnaces.

What is claimed is:

1. A method for periodic elongation of an electrode column for an electric arc furnace, comprising:

screwing onto an acting electrode of the electrode column, a new electrode by means of a threaded nipple having a longitudinal through hole therein, the new electrode having a cavity and there being cavities between the acting electrode and the nipple, and at a bottom of a threaded socket of the new electrode; and placing into the nipple through hole, a metal staged rod having a bigger diameter portion in the cavity of the new electrode, the melting temperature of the rod being lower than a working temperature of the acting electrode in the furnace, and the electric resistance of the rod being lower than the electric resistance of materials of each electrode and the nipple, and the volume of the rod being chosen to provide, after melting of the rod, filling up of the cavities between the nipple and the acting electrode after their screwing together, the through hole in the nipple, and at least the cavity between the nipple and the bottom of the threaded socket of the new electrode.

2. The method of claim 1, wherein aluminum is used as metal for the rod.

3. The method of claim 1, wherein copper is used as metal for the rod.

4. The method of claim 1, wherein the staged rod is compressed downward to the nipple.

5. The method of claim 4, wherein the staged rod is compressed to the nipple by means of a spring made of the same metal as the rod.

6. The method of claim 4, wherein the staged rod is compressed to the nipple by means of one metal swarf and granules of the same metal as the rod.

7. The method of claim 4, wherein the staged rod is compressed to the nipple by means of packing substance burning out under the working temperature of the electrode in the electric arc furnace.

8. An electrode for an electric arc furnace comprising:

an electrode body having an outer surface, a first end surface and an opposite second end surface;

each of said end surfaces containing a conical nipple socket and a cylindrical cavity communicating with the conical nipple socket; and wherein the cavity at said first end surface having a different diameter from the cavity at said second end surface.

9. The electrode of claim 8, including holes in the electrode body for communicating at least one of said cavities with the electrode outer surface.

10. The electrode of claim 9, wherein said holes are provided to be inclined relative the electrode outer surface.

* * * * *